Figure 3:
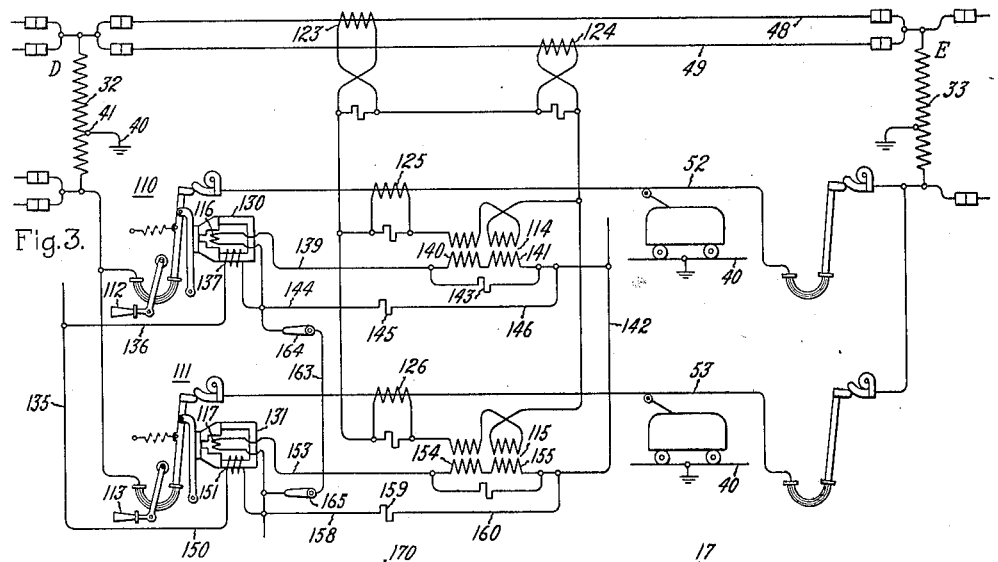

July 31, 1934.  J. W. McNAIRY  1,968,611
PROTECTIVE SYSTEM
Filed March 2, 1933  2 Sheets-Sheet 1
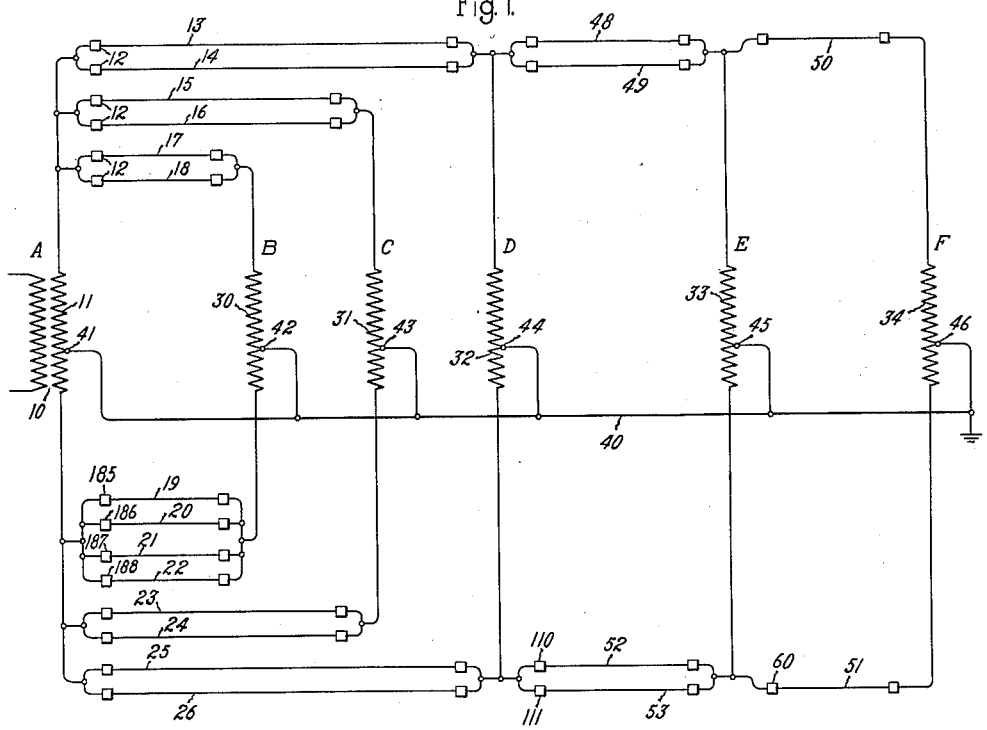
Inventor:
Jacob W. McNairy,
by Charles E. Tullar
His Attorney.

July 31, 1934.    J. W. McNAIRY    1,968,611
PROTECTIVE SYSTEM
Filed March 2, 1933    2 Sheets-Sheet 2

Inventor:
Jacob W. McNairy,
by Charles E. Tullar
His Attorney.

Patented July 31, 1934

1,968,611

UNITED STATES PATENT OFFICE 1,968,611

PROTECTIVE SYSTEM

Jacob W. McNairy, Erie, Pa., assignor to General Electric Company, a corporation of New York Application March 2, 1933, Serial No. 659,340

12 Claims. (Cl. 175—294)

My invention relates to alternating current network systems, more particularly to three-wire systems for electric railways, and has for its object the provision of a reliable, selective, protective system for disconnecting only that section of the trolley circuit in which a fault occurs.

As applied to multi-track electrified railways, distribution systems of the three-wire type consist of a plurality of high voltage feeder conductors and a plurality of trolley conductors interconnected to form a high voltage circuit, the trolley conductors being arranged to carry also the low voltage current supplied to the locomotives. An auto transformer is provided at each of the substations to provide a suitable trolley voltage, on the order of 12 kilovolts, while a much higher voltage exists between a feeder and a trolley, for example, 36 kilovolts. A grounded return circuit for the low voltage current supplied to the locomotives is formed by the rails.

Heretofore, the usual forms of protective systems have left much to be desired if the maximum reliability of operation with respect to train service is to be achieved. For example, a short circuit or ground fault across the 12 kilovolt winding of the auto transformer of any substation produces a very considerable increase in current through the trolley breakers at all intermediate substations. This increase in current would in all probability operate the trolley breakers at all intermediate substations so that the entire network would be subjected to interruption of service.

Since the feeders and trolleys are interconnected, the current distribution may vary through a wide range. That is to say, at a particular section of the network the feeder current may be substantially larger than the high tension current in the trolley circuit and under a different condition the trolley high tension current may be much greater than the feeder current. This may cause undesired operation of the breakers in systems heretofore used with consequent interruption of service.

Therefore, it is a further object of my invention to provide a protective system which insures uninterrupted operation of the locomotives on any part of the system not subjected to a fault.

In carrying out my invention in one form thereof I provide tripping circuits for the trolley circuit breakers so arranged that the circuit breakers for a particular trolley circuit are operated to isolate that trolley circuit only when the component of the trolley current returning through the rails rises at a predetermined rate, More specifically, I utilize the unidirectional transformer arrangement described in my Patent No. 1,756,924, dated April 29, 1930. Briefly, this transformer tripping circuit arrangement provides a unidirectional tripping impulse upon a rapid increase of current in an alternating current circuit.

In accordance with my invention I provide current transformers responsive to the current flowing in the respective feeders and I connect the transformers in opposition to current transformers responsive to the current flowing in the respective trolleys. The transformer tripping circuit arrangements are energized by the vector difference between the voltage produced by the respective feeder and trolley current transformers. Consequently, unidirectional tripping impulses for the respective trolley circuit breakers are produced, as a function of the rate of rise of the difference between the feeder and trolley currents, which difference represents the rail or ground component of the trolley current.

In accordance with the present invention, a tripping circuit is provided for each trolley circuit breaker and the tripping circuits are interconnected as described and claimed broadly in my Patent No. 1,824,728, dated September 22, 1931, so that selective operation is obtained upon the occurrence of a fault. Only the circuit breakers connected in the trolley upon which the fault occurs are tripped to their open positions. By differentially interconnecting the tripping circuits a higher value of current in each trolley circuit is required to trip the circuit breakers should a fault occur simultaneously on more than one of the trolley circuits. This condition most frequently results in the case where a fault occurs on a station bus; in a trolley section just beyond the station bus, or in a section adjacent to the section fed by the breakers under consideration. Thus, for example, where a certain percentage increase in trolley current will effect the tripping of one trolley circuit breaker, then when faults develop on two or more trolleys at exactly the same time, the percentage of current increase required to effect the tripping of each breaker is automatically and progressively increased as the number of trolleys developing faults at the same instant increases.

Figure 4:
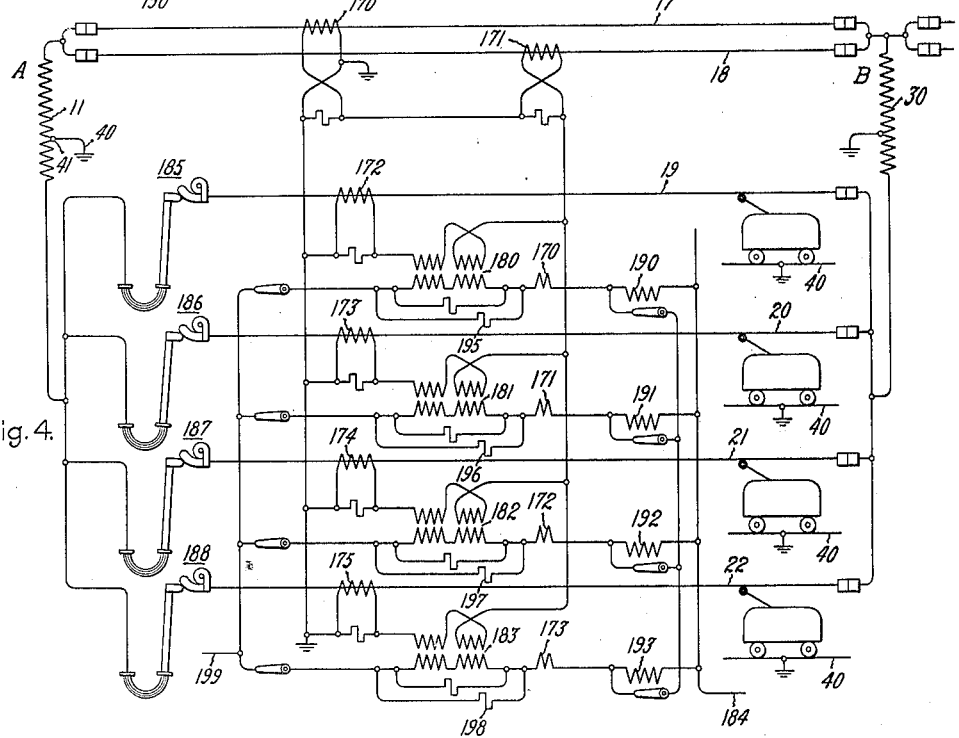
Figure 5:
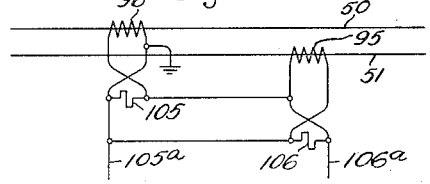

For a complete understand of my invention reference should now be had to the drawings, Fig. 1 of which illustrates a typical distribution system of the type to which my invention is readily applicable; Fig. 2 shows my invention applied to a portion of the system of Fig. 1; Fig. 3 shows my invention applied to the portion of the system of Fig. 1 wherein two trolleys and two feeders are interconnected; Fig. 4 illustrates my invention as applied to the section of Fig. 1 wherein two feeders and four trolleys are used, while Fig. 5 illustrates a modified connection of the current transformer.

Referring to the schematic diagram of Fig. 1, power is supplied to the network by a transformer 10, the secondary winding 11 being connected through circuit breakers 12 to feeders 13 to 18, inclusive, and to trolleys 19 to 26, inclusive. The power transformer 10 is located at station A and auto transformers 30 to 34, inclusive, are located at stations B to F, inclusive. Between station A and station B the feeders 17 and 18 supply power to the auto transformer 30, the return circuit being provided by the four trolley circuits 19 to 22, inclusive. The ground return circuit for the trolleys is provided by the grounded return conductor 40, which conductor is connected as indicated by the reference numerals 41 to 46, inclusive, to a portion of the winding of the auto transformers located at the respective stations. It will be observed that the feeders 17 and 18 form one leg of the three wire system, the trolley circuits 19 to 22, inclusive, and the grounded return circuit 40 forming the other legs of the system. Similarly, the corresponding feeders and trolleys form three wire systems for the remaining stations C to F, inclusive. Assuming now that electric locomotives or trolley cars are operating between stations E and F, it will be observed that current can flow out the feeders 13, 14, 48, 49 and 50 and return through the trolleys 51, 52, 53, 25 and 26. It will further be observed that while power is being used only in the section between stations E and F the current flows through the trolley circuit breakers located at the stations A, D, E and F. In accordance with the present invention, these trolley circuit breakers are not tripped to their open positions, however, due to this circulating current. They are also not tripped in the event of excessive circulating current resulting from faults or overloads on sections E and F.

Referring to Fig. 2, I have shown my invention in one form as applied to the section of the network of Fig. 1 extending between stations E and F. For the sake of clarity, only the trolley circuit-breaker 60 is shown connected to its transformer tripping circuit.

The circuit breakers and the relays of the type used in the feeder and trolley circuits are described and claimed in Tritle Reissue Patent No. 15,441, August 29, 1922, and the trip-free feature described in Tritle Patent No. 1,560,440, November 3, 1925, is employed in each of the circuit breakers and relays. Both of the Tritle patents mentioned are assigned to the same assignee as the present invention.

The circuit breaker 60 may be briefly described by stating that the movable switch element 61 is normally held in circuit closing engagement with a cooperating switch element 62. An armature 63 is mechanically connected with the movable switch element 61. The electromagnet 64 is provided with a holding winding 65 and a tripping winding 66, the holding winding 65 being normally energized from suitable direct current supply lines 67 and 68. The tripping winding 66 is arranged to effect the release of the armature 63 when energized with a unidirectional current of predetermined polarity. The arrangement is such that the tripping winding 66 shifts the holding flux of the electromagnet 64 from the armature 63 across the air gap between the poles of the electromagnet when the tripping winding 66 is properly energized. A very rapid opening of the circuit breaker is accomplished by a spring 69 which strongly biases the movable switch element 61 to the circuit opening position.

The energization of the tripping coil 66 is controlled by a high speed relay 70 which relay operates on exactly the same principle as the circuit breaker 60. Thus, for example, it is provided with a movable switch element 71, an armature 72, a magnet 73 provided with a holding coil 74 and a tripping coil 75, and a spring 76 which is arranged to bias the movable switch element 71 to a closed position.

The closing mechanism for the high speed relay 70 and the circuit breaker 60 is mechanically interlocked so that the relay 70 opens its contacts before the circuit breaker 60 is operated to the circuit closing position. Assuming now that a control switch 80 is operated to energize a motor 81 for rotation in a counter-clockwise direction, it will be observed that a cam 82 is moved to engage the relay switch member 71. The cam swings the element 71 about a pivot point formed by the stationary contact 83 of the movable contact 71 until the armature 72 is movable into engagement with the holding magnet 73. The cam 82 then releases the switch element 71, which element is rotated about pivot point 84 by the spring 76 to open the relay 70. The cam 87 at this point begins to close the circuit breaker 60 by swinging the switch element 61 about the pivot formed by the stop 77 until the armature 63 is moved into engagement with the holding magnet 64. As the cam continues its rotation the switch element 61 is released so that the spring 69 rotates the switch element 61 about the pivot 88 to close the circuit breaker.

Continuing with the operation of my invention, a predetermined flow of direct current or a unidirectional tripping impulse must be produced in the tripping winding 75 of the relay 70 so that the tripping winding produces a magnetomotive force in the proper direction across the poles of the relay 70 to close its contacts. To accomplish this tripping impulse I have made use of the transformer tripping circuit described and claimed in my Patent No. 1,756,924 and assigned to the same assignee as the present invention. This transformer tripping circuit comprises two transformers 90 and 91 having their primary windings 92 and 93 connected in opposition to each other and in circuit with a current transformer 95 responsive to the current flowing in the trolley 51 and a current transformer 96 responsive to the current flowing in the feeder 50. The transformer secondary windings 97 and 98 are connected in series with each other across the direct current supply lines 67 and 68 to form a transformer saturating circuit. This circuit may be traced from the direct current supply line 67, holding coil 74 of the relay 73, trip coil 75, transformer secondary windings 97 and 98 and to the other direct current supply line 68. The current in this circuit it will be observed serves to energize both the holding electromagnet 74 and the magnetic structure (not shown) for the transformers 90 and 91. As explained in my above mentioned patent, by reversely connecting the transformer primary windings 92 and 93 a direct current impulse is produced in the transformer secondary windings 97 and 98 when a predetermined variation in current occurs in the transformer primary windings 92 and 93. In order to insure sufficient current flow through the holding coil 74 a circuit in parallel with the circuit traced above is provided by conductor 100 extending from one side of the holding coil 74, through resistor 101, and to the other supply line 68. The circuit including the resistor 101 also forms a parallel path for the return of the direct current impulse produced by the transformer tripping circuit arrangement.

In order to prevent the production of the direct current impulse in response to currents flowing out the feeder 50 and back the trolley 51, the transformers 95 and 96 are connected in opposition to each other. Therefore, the voltage across the primary windings 92 and 93 is a function of the vector difference between the trolley current and the feeder current; the tripping impulse produced by the secondary windings 97 and 98 is a function of the increase of this resultant voltage, and the unidirectional tripping impulse is therefore a function of the increase in the vector difference between trolley current and feeder current. Thus, for example, it will be observed that when the current flowing out the feeder 50 is equal in magnitude to the current flowing back to the trolley 51, the voltage across the transformer primary windings 92 and 93 is zero. The voltage to which the tripping transformer primaries 92 and 93 are subjected is a function of the trolley rail component of the trolley circuit because any current which flows out the trolley and back to the rails, or vice versa, is not effective in tripping the relay 70. However, when a predetermined current suddenly flows from the trolley 51 to ground the current transformer 95 causes a corresponding rise in the voltage across the tripping transformer primary windings 92 and 93 so that a unidirectional impulse is caused to flow through the tripping coil 75 to close quickly the relay 70. This relay closes in a minimum time of approximately .0015 to .002 second. As soon as the contacts of the high speed relay 70 close, the trolley circuit breaker 60 is operated to its open circuit position. Thus it will be seen that as soon as the high speed relay 70 closes, the trip coil 66 of the circuit breaker 60 is energized through a circuit which may be traced from the direct current supply line 67, contacts 71 and 83 of the relay 70, conductor 102, interlock contacts 103 of the trolley breaker 60, trip coil 66 and by conductor 104 to the other direct current supply line 68.

The use of the high speed relay in conjunction with the circuit breaker 60 is preferred because of the complicated secondary connections necessary for interconnecting three wire systems of the type to which my invention has been applied. Furthermore, by the use of the high speed relay smaller current transformers may be used without danger of overloading them as would be the case if current transformers of the same size were used to produce a tripping impulse for the tripping coil 66 of the trolley breaker 60.

As explained above, the relay 70 in the circuit breaker 60 is provided with trip-free closing mechanism mechanically interlocked so that the contacts of the relay 70 are always opened before the circuit breaker contacts are closed. It will be remembered that the cam 82 operates the relay to its open circuit position and the cam 87 closes the circuit breaker 60. Therefore, if a direct current impulse is produced by the transformer tripping arrangement the relay 70 will be operated to its closed circuit position thereby preventing the closing of the trolley breaker 60. It will be further observed that the interlock contacts 103 operated with the armature 63 of the trolley breaker 60 are arranged to complete the circuit through the trolley breaker tripping coil 66 before the trolley breaker is operated to its closed circuit position.

Because the current transformers 95 and 96 are connected in opposition, it is necessary to provide a circuit for normal secondary current. Accordingly, there is provided in shunt with the respective secondary windings of the current transformers 95 and 96 resistances 105 and 106. These resistance circuits prevent saturation of the current transformers and the high voltage which would result with a very small primary current.

A resistance 108 is also connected in shunt relation with the transformer secondary coils 97 and 98. This resistor provides a return circuit for the tripping impulses of parallel breakers and increases the magnitude of the current through the holding coil 74.

Referring now to Fig. 3, I have shown my invention as applied to the portion of the system of Fig. 1 extending between stations D and E. For purposes of simplifying the drawings, the trolley circuit breakers 110 and 111 are each provided with manually operable closing mechanisms 112 and 113. The drawings are further simplified by omitting the high speed relays and connecting, respectively, the transformer tripping arrangements 114 and 115 directly to the trip coil 116 of the circuit breaker 110 and the trip coil 117 of the circuit breaker 111. In this portion of the system a fault on trolley 52 might cause an increase in the current flowing through trolley 53. The operation of the circuit breakers 110 and 111 connected respectively in series with the trolley circuits 52 and 53 differentiates, however, between fault conditions occurring on the respective trolleys. Furthermore, as described in connection with Fig. 2, the respective current transformers 123 and 124 responsive to the current flowing in the feeders 48 and 49 are connected in opposition to the current transformers 125 and 126 responsive to the current flowing in the trolleys 52 and 53. Therefore, currents flowing out the trolleys and back the feeders, or vice versa, are not effective in operating the tripping circuit arrangements. The transformer tripping circuit arrangements 114 and 115 are provided for the holding magnets 130 and 131 of the circuit breakers 110 and 111. The saturating current for the tripping transformer arrangement 114 is obtained from a circuit which may be traced from the direct current supply line 135, by conductor 136, holding coil 137, tripping coil 116, conductor 139, transformer secondary windings 140 and 141 and to the other supply line 142. As before, additional current flow, through the holding winding 137, is provided by resistance 143 and by a circuit extending from the supply line 135, by conductor 136, holding coil 137, conductor 144, resistor 145, and by conductor 146 to the other supply line 142. This circuit also provides a return path for tripping impulses. A similar circuit is provided for saturating the transformer tripping arrangement 115. This circuit may be traced from the direct current supply line 135, by conductor 150, holding coil 151, tripping coil 117, conductor 153, transformer secondary windings 154 and 155 and to the other supply line 142. Additional current flow through the holding coil 151 is obtained by connecting a conductor 158 to one side of the holding coil to provide a current path through a resistor 159 and by a conductor 160 to the other supply line 142. The tripping coils 116 and 117 of the respective circuit breakers are interconnected by means of a conductor 163 and the knife switches 164 and 165.

Assuming now that a fault occurs on the trolley 52, it will be observed that the current transformer 125 in response to the increase of current flowing from the trolley 52 will produce a corresponding rise in current in the primary windings of the transformer tripping arrangement 114. The result, of course, is the production of a unidirectional tripping impulse in the secondary windings 140 and 141 proportional to this A. C. current increase in the trolley circuit. This tripping impulse will flow from one side of the transformer secondary windings, by conductor 139, tripping coil 116, knife switch 164, conductor 163, knife switch 165, tripping winding 117, conductor 153, transformer secondary windings 154 and 155, supply line 142, and to the other side of the transformer secondary windings of the tripping arrangement 114. It will be observed that the tripping impulse through the trip coil 116 is in the proper direction to cause the circuit breaker 110 to be quickly operated to its open circuit position, while the current impulse through the trip coil 117 is in a direction to prevent the opening of the circuit breaker 111. A return circuit for the tripping impulse is also provided by the conductor 144, resistance 145 and the conductor 146.

Besides the selective operation described, if a fault should occur simultaneously on trolleys 52 and 53, both circuit breakers 110 and 111 can be made to operate to their open circuit positions if desired by making the resistances 145 and 139 sufficiently low. Under such a condition the tripping impulses will not flow through the knife switches 164 and 165 and the conductor 163 but in each case the tripping current impulses will flow through their respective return paths provided by the circuits including the resistors 145 and 159. The current increase required through each feeder under this condition is usually greater than with a fault on trolley alone.

Now that the principles of my invention have been explained, it will be understood that transformer tripping arrangements may be provided for any number of trolley circuits and as illustrated in Fig. 4 I have illustrated diagrammatically my invention as applied to the four trolley circuits extending between stations A and B of Fig. 1. The current transformers 170 and 171, responsive to the current flowing through the feeders 17 and 18 are connected in opposition to the current transformers 172 to 175, inclusive, which are respectively responsive to the current flowing through the trolleys 19 to 22, inclusive. Thus the tripping transformer arrangements 180 to 183, inclusive, for the respective circuit breakers 185 to 188, inclusive, are subjected to a voltage which is a function of the difference between the trolley currents and the feeder currents. Or, as I have before stated, the voltage to which each tripping circuit is subjected is a function of the particular trolley rail component of the trolley current. As described in connection with Fig. 4, the tripping coils 190 to 193, inclusive, are interconnected. If a fault occurs on trolley 19 the tripping impulse produced by the tripping transformer arrangement 180 flows through the tripping coil 170 of the circuit breaker 185 and divides through the trip coils 191, 192 and 193 so that the circuit breaker 185 is opened while the portion of the current impulse that returns through the remaining trip coils flows in such a direction as to prevent the opening of the circuit breakers 187 to 189, inclusive. In case a fault should occur simultaneously on the respective trolleys 19 to 22, the return circuits through the resistors 195 to 198, inclusive, are provided. These return circuits as before also serve to increase the current which can flow from the direct current supply line 199 through the respective holding coils 190—193 into the other supply line 184.

It is to be understood that the current transformers may be connected in parallel instead of in series, the operation being the same as described above.

For example, in Fig. 5 the current transformers 95 and 96 are shown connected in parallel, the conductors 105a and 106a being provided for connecting the transformers to the primary windings 92 and 93 of the transformers 90 and 91 illustrated in Fig. 2.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In combination, a system of distribution comprising a high voltage feeder forming one leg of a high voltage circuit, a low voltage conductor forming the other leg of said high voltage circuit, said conductor carrying both high voltage current and low voltage current, a grounded return circuit, transforming means interconnecting said circuits, a circuit breaker connected in circuit with said conductor, tripping means for said circuit breaker, and means responsive only to the low voltage component of the current in said conductor for operating said tripping means.

2. The combination with a three-wire, alternating current distribution system, a high voltage feeder forming one leg of the circuit, a low voltage trolley forming the outside leg, a ground return circuit, an auto transformer interconnecting said high voltage feeder and said trolley, of a circuit breaker connected in said trolley circuit, a tripping coil for said circuit breaker and means responsive only to the component of the trolley current flowing from said trolley to said ground return circuit for producing a unidirectional impulse through said tripping coil to operate said circuit breaker.

3. In combination with one or more feeders, a plurality of trolley circuits forming in conjunction with said feeders high voltage circuits, a grounded return circuit for the flow of low voltage current from said trolleys, a plurality of trolley circuit disconnecting switches each having automatic operating means responsive to the trolley-ground component of the trolley current for operating said switches to disconnect said trolley circuits, and automatic electrical means for preventing operation of said switches in response to flow of current circulating through said feeders and said trolley circuits.

4. In combination, one or more feeders interconnecting supply stations, a plurality of trolley circuits, an auto transformer interconnecting said feeders and said trolley circuits, a ground return circuit for said trolley circuits, disconnecting switches for said trolley circuits, and means responsive to a predetermined current flow from said trolley circuits to said ground return circuit for tripping said disconnecting switches, differential means differentially responsive to the current flow in said trolley circuits for rendering said means ineffective for all other abnormal divisions of current between said circuits.

5. The combination of an alternating current distribution system for supplying power to a plurality of stations, a feeder interconnecting said stations, a trolley and a grounded return circuit connected between said stations, transforming means at each of said stations connected between said feeder and said trolley for producing a predetermined voltage between said trolley and said grounded return circuit, a circuit breaker for said trolley circuit, a tripping coil for said circuit breaker, and means including a transformer tripping circuit arrangement responsive to the trolley ground component of the trolley current for generating a tripping impulse for said tripping coil.

6. In combination, one or more parallel feeders interconnecting supply stations, a plurality of trolley circuits, an auto transformer interconnecting said feeders and said trolley circuits, a ground return circuit for said trolley circuits, a disconnecting switch for each of said trolley circuits, means for tripping said switches in response to trolley-ground current flow comprising a transformer tripping circuit arrangement for each of said switches, a current transformer for each of said feeders and said trolley circuits, connections for connecting said feeder current-transformers in opposition to said trolley circuit current-transformers and connections for connecting each of said transformer tripping circuit arrangements in circuit with said current-transformers, each of said transformer arrangements producing a tripping current impulse for its respective circuit breaker in response to a predetermined rise in the trolley ground component of current flow.

7. The combination with a single phase, alternating current, three-wire distribution system for railways and the like having a plurality of feeders interconnecting stations to form one leg of the system, a plurality of trolley circuits extending between said stations and to form another leg of said three-wire system, the other leg of said system being formed by a grounded rail return circuit, and autotransformers located at said stations interconnecting said legs of said three-wire circuit, of a circuit breaker for each of said trolley circuits normally biased to the open position and arranged to be quickly operated to the open circuit position, a trip coil for each of said circuit breakers, a transformer tripping arrangement connected in circuit with each of said trip coils, a current transformer for each of said feeders and for each of said trolley circuits responsive to the current flowing through said respective feeders and trolley circuits, connections for connecting said current transformers in said feeder circuits in opposition to the current transformers in said trolley circuits and to said transformer tripping arrangement so that a tripping current impulse is produced by a particular transformer tripping arrangement in response to the rate of rise of the corresponding trolley rail component of trolley current, and connections for interconnecting said tripping coils so that a tripping impulse from any one of said transformer tripping arrangements trips its corresponding circuit breaker and flows through the remainder of said tripping coils in a direction to prevent the opening of said other circuit breakers, and connections for providing a return circuit from each of said trip coils to the corresponding transformer tripping arrangements so that said circuit breakers are simultaneously tripped to their open circuit positions upon the simultaneous occurrence faults on all of said trolley circuits.

8. In combination, a system of distribution comprising a high voltage feeder forming one leg of the circuit, a low voltage conductor forming the other leg of said high voltage circuit, a grounded return circuit, transforming means interconnecting said circuits, a circuit breaker normally biased to the open position connected in circuit with said conductor, a trip coil for said circuit breaker, a relay normally biased to one circuit controlling position for controlling the energization of said trip coil, means restraining said relay in a second circuit controlling position, means responsive only to said conductor ground component of said conductor current for permitting operation of said relay from said second position to said first position, and means for reclosing said circuit breaker after said relay has been operated against its bias to said second position.

9. The combination with an alternating current distribution system of the three-wire type, a high voltage feeder forming one leg of the system, a low voltage trolley forming the outside leg and a grounded return circuit, an autotransformer interconnecting said high voltage feeder and said trolley, of a circuit breaker connected to said trolley circuit, a tripping coil for said circuit breaker, a relay provided with a tripping coil for controlling the energization of said circuit breaker tripping coil, means responsive only to the trolley ground component of the trolley current for producing a unidirectional impulse through said tripping coil to operate said relay, and means for first opening said relay and then closing said circuit breaker.

10. In combination, a circuit breaker operable between open and closed circuit positions, means for biasing said circuit breaker to said open circuit position and holding means for holding said circuit breaker in said closed circuit position against its bias, a relay having an armature movable between open and closed circuit positions, means for biasing said armature to said closed circuit position, holding means for holding said armature against its bias in said open circuit position, and a single means for operating said relay against its bias to said open position and thereafter operating said circuit breaker against its bias to said closed position.

11. In combination, a circuit breaker operable between open and closed circuit positions, means for biasing said circuit breaker to said open circuit position and holding means for holding said circuit breaker in said closed circuit position against its bias, a relay having an armature movable between open and closed circuit positions, means for biasing said armature to said closed circuit position, holding means for holding said armature against its bias in said open circuit position, a reclosing mechanism for said circuit breaker for operating said circuit breaker against its bias to said closed position, and means mechanically interlocked with said reclosing mechanism for operating said relay against its bias to said open position before said circuit breaker reaches said closed position.

12. In combination, a circuit breaker having an armature movable between open and closed circuit positions, means for biasing said armature to said open position, a holding magnet for holding said circuit breaker in said closed position, a tripping coil for producing a magnetomotive force on said holding magnet to release said armature for operation in accordance with its bias to said open circuit position, a relay having an armature operable between open and closed circuit positions for controlling the energization of said trip coil, means for biasing said armature to said closed position, a holding magnet for holding said armature against its bias in the said open position, a relay tripping coil for producing a magnetomotive force on said relay to release said armature, and reclosing mechanism for said relay and said circuit breaker for operating said relay to said open position before said circuit breaker is operated to said closed position.

JACOB W. McNAIRY.